No. 714,253. Patented Nov. 25, 1902.
J. F. STEWARD.
METHOD OF MAKING METAL WHEELS.
(Application filed July 28, 1902.)

(No Model.)

Witnesses
J. C. Fuller.
Torris H. Alfreds.

Inventor.
John F. Steward.

THE NORRIS PETERS CO., PHOTO-LITHO., WASHINGTON, D. C.

UNITED STATES PATENT OFFICE.

JOHN F. STEWARD, OF CHICAGO, ILLINOIS.

METHOD OF MAKING METAL WHEELS.

SPECIFICATION forming part of Letters Patent No. 714,253, dated November 25, 1902.

Application filed July 28, 1902. Serial No. 117,223. (No model.)

*To all whom it may concern:*

Be it known that I, JOHN F. STEWARD, of Chicago, in the county of Cook, State of Illinois, have invented a new Method of Making Metal Wheels, of which the following is a full description, reference being made to the accompanying drawings, in which—

Figure 1:
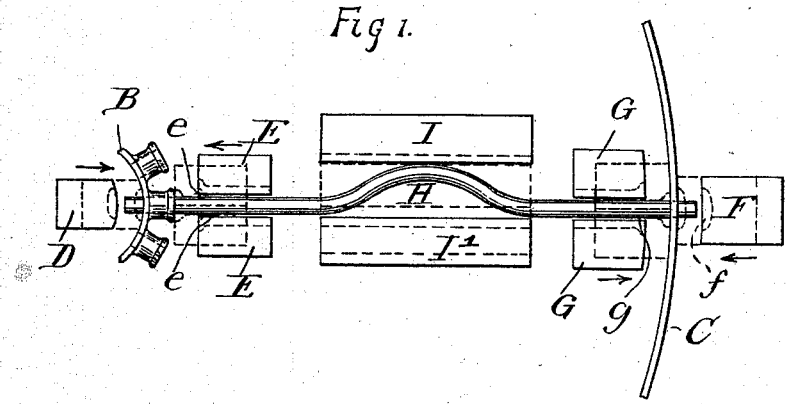
Figure 2:
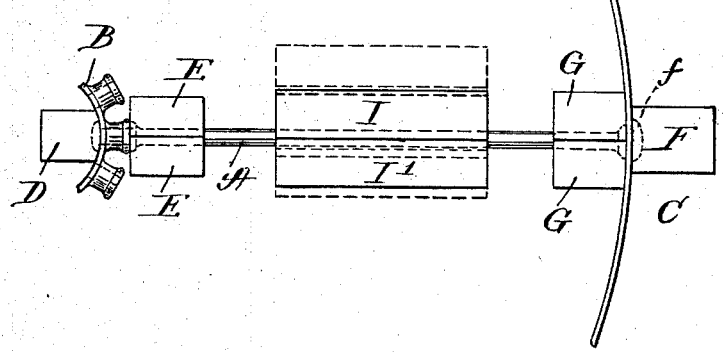
Figure 3:
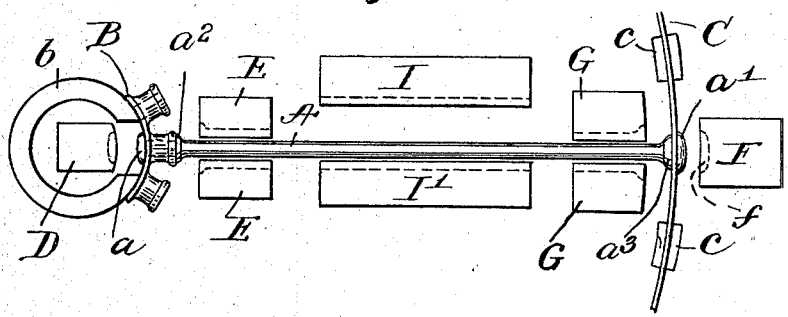

Figure 1 shows a segment of the hub of a wheel, a segment of the rim of a wheel, and the blank from which the finished spoke is produced, as well as the jaws and heading-tools designed to secure the spoke in the hub and rim, the jaws and heading-tools shown in full lines in position before closing upon the spoke and in dotted lines after closing upon them and forming the heads and shoulders. Fig. 2 shows the complete spoke with the jaws in the position they occupy when the spoke is finished, and Fig. 3 shows the spoke secured to hub and rim and the jaws and heading-tools retracted to permit the removal of the wheel from its position to the position necessary for putting a new spoke in position to be operated upon.

The finished spoke A is headed within the hub at $a$ and outside the rim, as shown at $a'$. A shoulder $a^2$ is formed on the outside of the hub and a shoulder $a^3$ on the inside of the rim. In short, a head and shoulder is provided to maintain its position in the hub B and also a head and shoulder to maintain its position in the rim of the wheel C. The hub here shown is of a well-known kind; but the high bosses shown are not essential.

In order to provide sufficient stock for the shoulders and heads, I cut the rod to form the spoke sufficiently long to supply the same, and in order that the hub and spoke may be clamped in place and both ends of the shoulder produced simultaneously I bend the spoke as shown in Fig. 1.

I show only so much of my machine as is necessary to make the method clear. The machine itself will form the subject-matter of another application. Suffice it to say that D is a heading-tool within the hub, adapted to move in the direction indicated by the arrow to the position shown in dotted lines and in this movement upsetting the end of spoke within the hub.

E is a pair of jaws that are provided with countersinks $e$. These jaws are operated by any suitable means to grip the spoke and move in the direction indicated by the arrow and to the position shown in dotted lines simultaneously with the movement of the heading-tool D.

F is a heading-tool provided with a countersink $f$, and thus adapted by its movement in the direction indicated by the arrow to produce the head $a'$.

G G form a pair of jaws that have countersinks $g$ and are adapted to grip the spoke and, moving to the position indicated by the dotted lines in Fig. 1, produce the shoulder $a^3$. The necessary material for the shoulders $a^2$ and $a^3$ is supplied by the surplus previously forming the bend H. (Shown in Fig. 1.) The movement of the heading-tools D and F and the pairs of jaws E and G are simultaneous. It is desirable to heat the spoke its entire length; but even then the movement of the jaw E and G will not always draw the bend out of the spoke. In order that the spoke may be fully straightened, the jaws I and I' are moved toward each other to the position shown by full lines in Fig. 2 and sufficient pressure given to fully straighten the spoke.

The figures may be considered to be plan views and only the upper ends of the jaws shown, while the lower ends may be considered to be pivoted and actuated by any suitable mechanism.

This application is intended only to cover the method, and any well-known means used in manufacturing similar wheels may be resorted to. The application to follow will show the mechanism that seems to be best adapted to the purpose.

$b$ is a support for the hub, and $c\ c$ supports for the rim, which by being made vertically movable may lift the complete spoke out of the jaws in order that the rim and hub may turn to a position to receive another spoke.

What I claim as my invention, and desire to secure by Letters Patent, is—

1. The method of making metal wheels, consisting in forming spoke-holes in the rim and hub, inserting therein a bent rod cut to sufficient length to form the spoke, clamping the spoke at points some distance without the hub and within the rim, with jaws adapted to move in a direction longitudinal with the axis of the spoke, moving the said jaws and the ends of the spoke held therein until one jaw approximately contacts the said hub and the other the said rim, and with the said jaws and suitable coöperative elements upsetting the ends of the spoke, thus forming shoulders within the rim and without the hub and heads without the rim and within the hub, substantially as described.

2. The method of making wheels, consisting in placing the hub and rim in fixed positions, placing a bent rod in position in the hub and rim, grasping it by suitable jaws at such a distance from said hub and rim that the metal between said jaws and rim and jaws and hub shall be sufficient to form shoulders of the intervening portion of said rod, and leaving a sufficient length of the rod within the hub and without the rim to form heads of the spoke, and forming the said shoulders and heads by simultaneous movements of the gripping-jaws and the heading-tools, substantially as described.

3. The method of making wheels consisting in placing the hub and rim in fixed positions, bending the rod that is to form the spoke, placing the said rod in position in the hub and rim, grasping it by suitable jaws at such a distance from said hub and rim that the metal between said jaws and rim and jaws and hub shall be sufficient to form shoulders of the intervening portions of said rod, and a sufficient length of rod within the hub and without the rim to form heads of the ends of the spoke and forming said shoulders and heads by the simultaneous movements of the gripping-jaws and the heading-tools, and giving the spoke a final straightening to remove the bend previously given it, substantially as described.

JOHN F. STEWARD.

In presence of—
J. C. WARNES,
H. H. SYMMS.